US008024765B2

(12) United States Patent
Ramanathan et al.

(10) Patent No.: US 8,024,765 B2
(45) Date of Patent: Sep. 20, 2011

(54) METHOD AND SYSTEM FOR COMMUNICATING MEDIA PROGRAM INFORMATION

(75) Inventors: Krishnan Ramanathan, Karnataka (IN); Ajay Gupta, Karnataka (IN); Shekhar Ramachandra Borgaonkar, Karnataka (IN); Arnaud Francois Paul Salomon, Karnataka (IN); Chakradhar Dandu, Karnataka (IN); Somnath Banerjee, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 11/611,900

(22) Filed: Dec. 18, 2006

(65) Prior Publication Data
US 2008/0026694 A1 Jan. 31, 2008

(30) Foreign Application Priority Data
Jul. 26, 2006 (IN) .......................... 1296/CHE/2006

(51) Int. Cl.
*H04N 7/173* (2011.01)
*H04N 7/10* (2006.01)
*H04N 7/16* (2011.01)

(52) U.S. Cl. .............. 725/110; 725/32; 725/34; 725/35; 725/36; 725/112; 725/136

(58) Field of Classification Search ............... 725/32, 725/34–36, 112, 136
See application file for complete search history.

(56) References Cited

U.S. PATENT DOCUMENTS

| 5,659,368 | A * | 8/1997 | Landis .......................... 348/467 |
| 5,828,839 | A | 10/1998 | Moncreiff |
| 6,061,716 | A | 5/2000 | Moncreiff |
| 6,081,830 | A | 6/2000 | Schindler |
| 6,249,806 | B1 | 6/2001 | Kohda et al. |
| 6,425,012 | B1 | 7/2002 | Trovato et al. |
| 6,519,771 | B1 | 2/2003 | Zenith |
| 6,545,722 | B1 | 4/2003 | Schultheiss et al. |
| 6,754,904 | B1 * | 6/2004 | Cooper et al. ................... 725/32 |
| 6,766,374 | B2 | 7/2004 | Trovato et al. |
| 6,774,926 | B1 | 8/2004 | Ellis et al. |
| 6,983,305 | B2 | 1/2006 | Danker et al. |

(Continued)

FOREIGN PATENT DOCUMENTS
EP 1111926 A2 6/2001
(Continued)

OTHER PUBLICATIONS

"AmigoTV: A Social TV Experience through Triple-Play Convergence" <http://www.telecomreview.ca/eic/site/tprp-gecrt.nsf/vwapj/AmigoTV.pdf/$FILE/AmigoTV.pdf> 2005.

(Continued)

*Primary Examiner* — Christopher Kelley
*Assistant Examiner* — Gigi L Dubasky

(57) ABSTRACT

A method for communicating media program information is provided. The method includes receiving a content-augmented broadcast signal at a conventional broadcast receiver, the content-augmented broadcast signal having a program content and a program cookie relating to the program content, demodulating the content-augmented broadcast signal, rendering the program content, recovering the program cookie from the demodulated content-augmented broadcast signal at substantially the same time the program content is rendered, determining whether the program cookie comprises information relating to a current media program a user is currently watching or listening to, or to an advertisement of a future media program, and sending the program cookie to an electronic device.

26 Claims, 7 Drawing Sheets

U.S. PATENT DOCUMENTS

| | | | |
|---|---|---|---|
| 7,140,033 B1 * | 11/2006 | Durden et al. | 725/80 |
| 7,395,031 B1 * | 7/2008 | Ritter | 455/77 |
| 2001/0051989 A1 | 12/2001 | Moncreiff | |
| 2002/0056088 A1 | 5/2002 | Silva, Jr. et al. | |
| 2002/0112239 A1 | 8/2002 | Goldman | |
| 2002/0129364 A1 | 9/2002 | Smith et al. | |
| 2002/0133827 A1 | 9/2002 | Newnam et al. | |
| 2002/0144273 A1 | 10/2002 | Reto | |
| 2002/0174234 A1 | 11/2002 | Trovato et al. | |
| 2002/0184309 A1 | 12/2002 | Danker et al. | |
| 2002/0184634 A1 | 12/2002 | Cooper | |
| 2003/0018971 A1 | 1/2003 | McKenna, Jr. | |
| 2003/0066074 A1 | 4/2003 | Zimmerman et al. | |
| 2003/0076367 A1 | 4/2003 | Bencze et al. | |
| 2003/0078969 A1 | 4/2003 | Sprague et al. | |
| 2003/0078972 A1 | 4/2003 | Tapissier et al. | |
| 2003/0084444 A1 | 5/2003 | Ullman et al. | |
| 2003/0097408 A1 | 5/2003 | Kageyama et al. | |
| 2003/0101450 A1 | 5/2003 | Davidsson et al. | |
| 2003/0225833 A1 | 12/2003 | Pilat et al. | |
| 2004/0003402 A1 * | 1/2004 | McKenna, Jr. | 725/46 |
| 2004/0010808 A1 | 1/2004 | deCarmo | |
| 2004/0107439 A1 | 6/2004 | Hassell et al. | |
| 2004/0117831 A1 | 6/2004 | Ellis et al. | |
| 2004/0117837 A1 | 6/2004 | Karaoguz et al. | |
| 2004/0174905 A1 | 9/2004 | Caspi et al. | |
| 2004/0205815 A1 * | 10/2004 | Hwang | 725/46 |
| 2004/0210944 A1 | 10/2004 | Brassil et al. | |
| 2004/0231003 A1 | 11/2004 | Cooper et al. | |
| 2004/0260753 A1 | 12/2004 | Regan | |
| 2005/0060362 A1 | 3/2005 | Wolinsky et al. | |
| 2005/0066363 A1 | 3/2005 | Rambo | |
| 2005/0066364 A1 | 3/2005 | Rambo | |
| 2005/0066365 A1 | 3/2005 | Rambo | |
| 2005/0086211 A1 | 4/2005 | Mayer | |
| 2005/0091694 A1 | 4/2005 | Rambo | |
| 2005/0108767 A1 * | 5/2005 | Ma | 725/105 |
| 2005/0141542 A1 | 6/2005 | Handekyn et al. | |
| 2005/0149987 A1 | 7/2005 | Boccon-Gibod et al. | |
| 2005/0196139 A1 * | 9/2005 | Blackketter et al. | 386/46 |
| 2005/0246747 A1 * | 11/2005 | Braun et al. | 725/81 |
| 2005/0262542 A1 | 11/2005 | DeWeese et al. | |
| 2005/0278427 A1 | 12/2005 | Danker et al. | |
| 2005/0283800 A1 | 12/2005 | Ellis et al. | |
| 2006/0031375 A1 | 2/2006 | Danker et al. | |
| 2007/0061832 A1 * | 3/2007 | Kim et al. | 725/14 |
| 2007/0203839 A1 * | 8/2007 | Terauchi et al. | 705/51 |

FOREIGN PATENT DOCUMENTS

| | | |
|---|---|---|
| EP | 1119192 A2 | 7/2001 |
| JP | 20040040698 A | 2/2004 |
| JP | 2005167345 A | 6/2005 |
| WO | 9821664 A1 | 5/1998 |
| WO | 0064150 A1 | 10/2000 |
| WO | 0150753 A1 | 7/2001 |
| WO | 02073925 A2 | 9/2002 |
| WO | 2003047257 A1 | 6/2003 |
| WO | 03088666 A1 | 10/2003 |

OTHER PUBLICATIONS

Needleman, Rafe "Buddy List for the Boob Tube;" CNET News <http://ecoustics-cnet.com.com/8301-10784_3-6037095-7.html?part=ecoustics-cnet> Feb. 8, 2006.

Abreu, Jorge, Pedro Almeida, Vasco Branco. "2BeOn-Interactive Television Supporting Interpersonal Communication;" Department of Communication and Art, University of Averio. Aveiro, Portugal. <http://virtual.inesc.pt/egmm2001 proceedings/abreu.pdf>.

Ihnatko, Andy. "MacWorld: Secrets: Geek Factor;" Jun. 7, 2004. <http://www.macworld.com/2004/06/secrets/junegeekfactor/index.php?pf=1>.

Kharif, Olga. "PARC to Make TV Watching More Social" Mar. 22, 2005. <http://www.businessweek.com/ the_thread/techbeat/archives/2005/03/parc_to_make_tv.html>.

Rowson, James a., Rich Gossweiler, Kurt MacDonald1 "PHIZ : Discovering TVs Long Tail Through a Channel-Centric Model" May 5, 2005, HP Laboratories. Palo Alto, CA. <http://www.richgossweiler.com/projects/CustomTV/HPL-2005-84.pdf>.

Snider, Mike. "Instant Messaging on Fast Track". USA Today. Aug. 11, 1999. <http://www.microsoft.com/presspass/ofnote/08-11usatoday.mspx?pf=true>.

Coates, Tom. "Social Software for Set-Top Boxes" <http://www.plasticbag.org/files/misc/social_softwarefor_settop_boxes.pdf> Mar. 23, 2005.

"Siemens AG-CeBIT 2006-Innovation Compass;" <http://www.siemens.com/index.jsp?sdc_p=ft4mIsu4o1347997ni1347993pCBITcz3&sdc_sud=4079819225&>.

"Tandberg First in Industry to Include Advanced Security in All Products, Instant Messaging for Business-Quality Video" <http://www.tandberg.net/press_room/viewPressRelease.do?id=22> Jan 26, 2004.

Chartrand, Sabra. "Tuning in To Television, Two Ways;" The New York Times: Jun. 28, 2004. <http://www.nytimes.com/2004/06/28 technology/28patent.html?38;partner=rssuserland&en=2fdbae523adaa2e3&ex=1246075200ei=5090&pagewanted=print&position=>.

Bui, Ngan, Joseph Lo, Josh Rollyson. "WebTV and Internet Relay Chat;" <http://www.irchelp.org/irchelp/misc/webtv.html> Jun. 24, 2000.

Vliet, Harry Van. "Where Television and Internet Meet . . . " E-View. <http://comcom.uvt.nl/e-view/02-1/vliet.pdf> May 2, 2006.

"Wireless Mediacenter Wireless Media Server;" <http://www.worldonip.com/wmediacenter.htm> Jun. 5, 2004.

* cited by examiner

METHOD AND SYSTEM FOR COMMUNICATING MEDIA PROGRAM INFORMATION

FIELD OF THE INVENTION

The invention relates generally to media program information, and more specifically, to a method and system for communicating media program information using content-augmented broadcast signals.

BACKGROUND OF THE INVENTION

Television and radio broadcasting technologies are very well suited for providing content to audience (i.e. viewers and listeners) on a large scale. Especially in developing countries where opportunities for entertainment are limited, televisions and radios provide the largest audience for the entertainment media. Businesses are also heavily relying upon radio and television broadcastings to advertise their products in the most cost effective way. Government entities also use radio and television broadcasts to reach as many people as possible in conveying information.

Many media programs are broadcasted by various television and radio stations throughout day and night. Some stations even support a 24-hr broadcasting schedule. Unless the people watching or listening to the media programs have an Electronic Program Guide (EPG) or an exceptional memory, they may not be able to remember all the media programs they are interested in watching or listening to. As a result, they may miss the media programs they intend to watch or listen to.

In addition, knowledge of what programs other people are watching or listening to is important and useful information. For example, media program providers may use such information to find out what type of programs are more popular, or to know what other people are paying attention to. Such information also enables advertisers to find out who are more interested in their products, and direct more of their advertisements to them.

Even among a group of friends, a person may want to know whether his friends are watching or listening to the same program as him. He has to call his friends to find out whether they are watching or listening to the same program, and inform them of the interesting program currently being broadcasted if they are not watching it.

Therefore, it is desirable to be able to know what media programs people are currently watching or listening to, and also to be able to inform people on the media programs which will be broadcasted in future.

SUMMARY OF THE INVENTION

In an embodiment, a method for communicating media program information is provided. The method includes receiving a content-augmented broadcast signal at a conventional broadcast receiver, the content-augmented broadcast signal having a program content and a program cookie relating to the program content, demodulating the content-augmented broadcast signal, rendering the program content, recovering the program cookie from the demodulated content-augmented broadcast signal at substantially the same time the program content is rendered, determining whether the program cookie comprises information relating to a current media program a user is currently watching or listening to, or to an advertisement of a future media program, and sending the program cookie to an electronic device.

BRIEF DESCRIPTION OF THE DRAWINGS

The embodiments of the invention will be better understood in view of the following drawings and the detailed description.

DETAILED DESCRIPTION OF THE INVENTION

Figure 1:
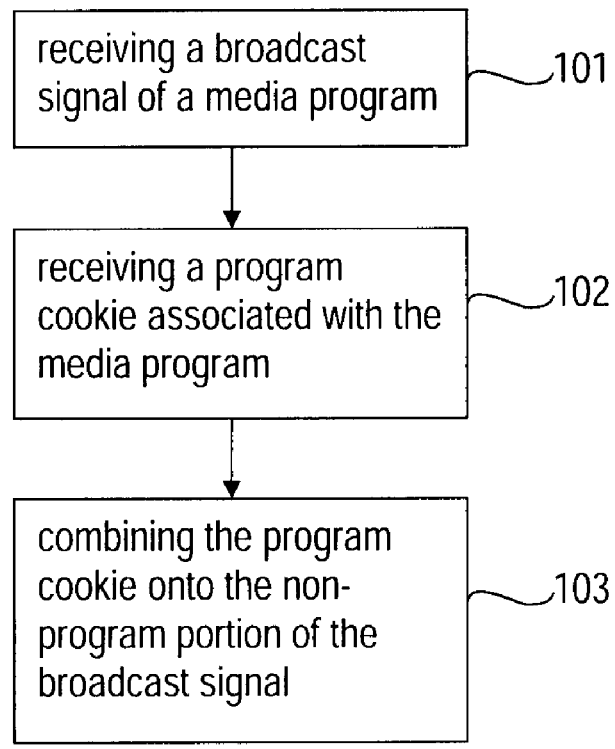
FIG. 1 shows a flow-chart of a method for forming a content-augmented broadcast signal according to an embodiment.

For clarity and convenience, the following definitions are used herein:

The term "content-augmented broadcast signal" refers to a broadcast signal of a standard television or radio program (i.e. having a standard program content) which has "supplemental content" added to the broadcast signal. The content-augmented broadcast signal has the format of the original television or radio broadcast signal. Typically, the supplemental content is modulated to a non-program portion of the broadcast signal while the program content is carried on a program portion of the broadcast signal "Supplemental content" defines information and data which are complementary and specific to the standard program content communicated by the broadcast signal and is specific to the standard program content conveyed by the particular segment of the broadcast signal. The supplemental content is able to be reproduced on an electronic device, or stored in a data storage device concurrently with the rendering of the standard program content to which the supplemental content is associated.

The description "non-program portion" refers to the portion of the broadcast signal (radio or television, analog or digital) which is reserved for conveying information different from the standard program content. The non-program portion of the broadcast signal is the vehicle by which the supplemental content is conveyed to the receiver. Exemplary embodiments of non-program portion of the broadcast signal include the vertical blanking interval (VBI) of an analog television signal or an equivalent signal portion of digital television broadcast signal (referred to as DVB-VBI and DVB-TXT in the Digital Video Broadcast (DVB) Standard), the Vertical Ancillary Space (VANC) of an HDTV broadcast as well as equivalents in the radio broadcasting field, e.g., the programming associated data channel in a digital audio broadcast signal.

The term "conventional broadcast receiver" refers to radio and/or television receivers which are primarily dedicated to the function of receiving radio and/or television broadcasts, respectively. The conventional broadcast receiver also has a demodulation circuitry operable to extract standard program content from the content-augmented broadcast signal.

"Conventional radio receivers" include digital audio radios. Analog radio receivers operable to separate standard programming and non-programming content from a radio broadcast signal may be employed in alternative embodiments.

"Conventional television receivers" include analog television sets configured to process broadcast signals transmitted in NTSC, PAL and SECAM broadcast formats, digital televisions receivers operable to process HDTV broadcasts and the like.

The term "conventional" as used with regard to broadcast, radio, or television receivers refers to the primary functionality of the broadcast receiving system as described, and does not refer to the timing of when such a broadcast system was developed or deployed, which may be at any time during the past, present or future.

FIG. 1 shows a flow-chart of a method for forming a content-augmented broadcast signal according to an embodiment. The method may be performed at a broadcast station or at any entity which produces a media (television or radio) program to be broadcasted. Step 101 includes receiving a broadcast signal of the media program. The broadcast signal includes a program portion containing a standard program content and a non-program portion onto which a supplemental content can be combined. According to an embodiment, the supplemental content is a program cookie and is received in step 102. The program cookie is associated with the particular media program. Step 103 includes combining the program cookie onto the non-program portion of the broadcast signal to form the content-augmented broadcast signal. The content-augmented broadcast signal includes the standard program content, which can be rendered on a conventional broadcast receiver, and the program cookie, which can be further processed.

The non-program portion of the broadcast signal may be the vertical blanking interval (VBI) or the horizontal blanking interval (HBI) of an analog television broadcasting signal. More recently, a variety of digital video broadcast (DVB) standards are also used for broadcasting media programs via satellite (DVB-S), cable (DVB-C), terrestrial (DVB-T), or via handheld and mobile terminals (DVB-H). Similar to the VBI standards of analog TV broadcast signals, DVB broadcast signals also allow the simulcasting of supplemental content data through DVB-TXT or DVB-VBI. When a digital broadcasting system is employed, the DVB-TXT/VBI standard is used to deliver the supplemental content as described in the foregoing. In HDTV broadcast, the Vertical Ancillary space (VANC) is used to deliver the supplemental content. For convenience, the description "vertical blanking interval" shall refer to the vertical blanking interval of the analog broadcast television signal, as well as the equivalent portion of the digital broadcast television signal and HDTV broadcast.

As mentioned, the broadcast signal may be a radio broadcast signal. As an example, a digital audio broadcast (DAB) system employs a non-program audio signal component known as a program associated data (PAD) channel which can be used as the vehicle for transporting the supplemental content, that is, the program cookie.

Figure 2:
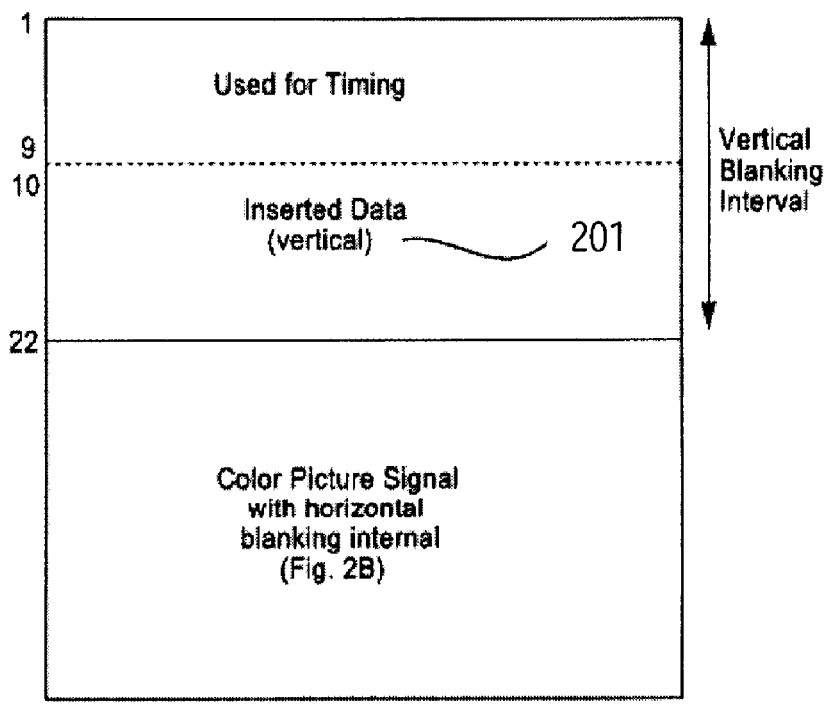
FIG. 2 shows a location of a VBI in a conventional television broadcast signal employed in the embodiments.

FIG. 2 shows the location of a VBI in a conventional television broadcast signal employed in the embodiments. Data 201 can be inserted in the VBI lines. In the case of NTSC, the VBI lines are from line 10 to line 22.

Figure 3:
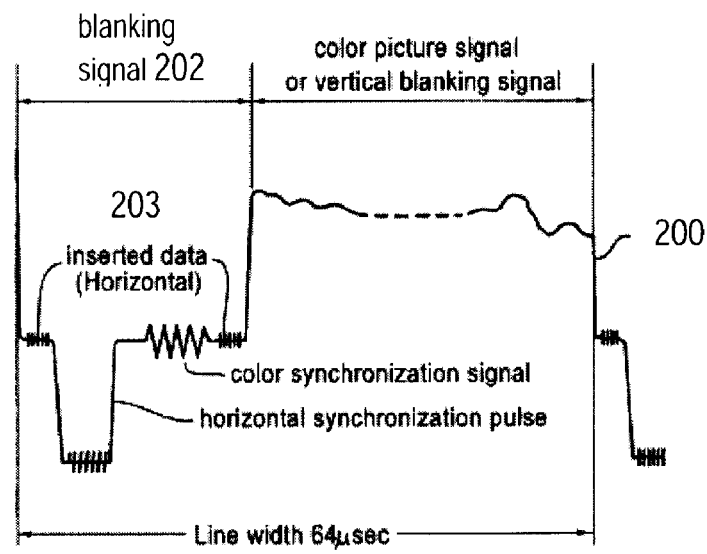
FIG. 3 shows a HBI in an analog television signal which may be employed in the embodiments.

FIG. 3 shows the HBI in an analog television signal which may be employed in the embodiments instead of the VBI. Data 203 which is combined onto the horizontal blanking portion 202 is not displayed on the television screen with the standard program content, as a television tuner is operable to process only the standard program content embedded in the other portions of the television broadcast signal 200. Accordingly, references made to VBI in the description shall also extend to HBI.

In an embodiment, the non-program portion of the broadcast signal is utilized to transport a program cookie specific to the standard program content of the broadcast signal. In a further embodiment, the program cookie modulated onto a particular non-program portion represents a supplemental content associating with the standard program content embedded in adjacent program portions of the broadcast signal. In this way, each program segment have a corresponding program cookie associated therewith and the program cookie can be accessed substantially concurrently with the rendering of the segment of the standard program content at the conventional television set.

Figure 4:
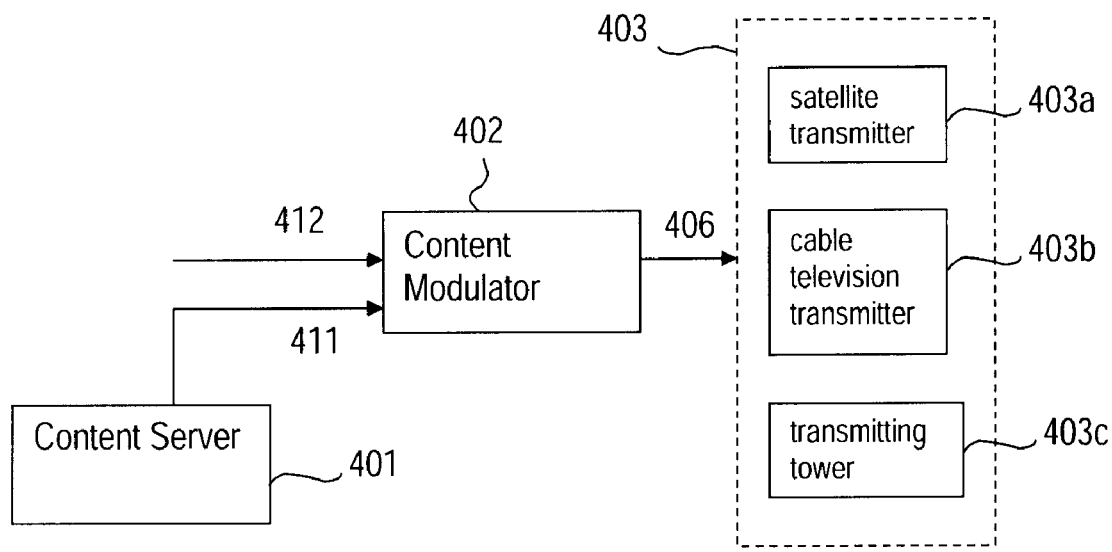
FIG. 4 shows a system for forming the content-augmented broadcast signal corresponding to the method depicted in FIG. 1.

FIG. 4 shows a system for forming the content-augmented broadcast signal corresponding to the method in FIG. 1. The system 400 includes a content server 401, a content modulator 402 and a broadcast means 403. The broadcast means 403 may include a satellite transmitter 403a, a cable television transmitter 403b, or a transmitting tower 403c. These broadcasting means 403a, 403b, 403c are only examples, and other transmitters may be used in other embodiments.

The content server 401 is operable to provide the program cookie 411, which is the supplemental content associated with a particular current media program. In an embodiment, the program cookie 411 includes information on the channel and name of the current media program. Additionally, if what is being broadcasted relates to an advertisement of a future media program, the program cookie 411 includes the channel, name, date, time and duration of the future media program. Those skilled in the art will appreciate that other information relating to the current or future media program may be included.

In an embodiment, the program cookie 411 is organized into a structured file or document, such as an extensible markup language (XML) document. As such, the program cookie 411 includes meta-data which is tagged using known broadcast industry adopted tags and fields. For example, identification of a sponsor/advertiser may be identified using a meta-data tag "Sponsor ID". Other meta-data tags corresponding to additional information may also be used. For example, meta-data tag "Lang ID" may be used to identify the language of the program cookie 411, "Date ID" to identify the date of a future media program, and "Enc ID" to identify encryption information. The aforesaid tags represent only a small sample of the possible meta-data tags and types of information which can be conveyed, and other meta-data tags may be used alternatively to or in addition thereto in other embodiments.

The content modulator 402 receives the program cookie 411 and a standard broadcast signal that carries the standard program content 412 of the media program, and modulates the program cookie 411 onto the VBI of the broadcast signal to form the content-augmented broadcast signal 406. The content-augmented broadcast signal 406 retains the signal waveform of the original standard broadcast signal, and can therefore be processed by a conventional television or radio set.

The standard program content 412 typically includes audio/video portions of the media program, which may be previously recorded or produced in real time. Additional processes may be used to complement the modulation processes. For example, a forward error correcting (FEC) algorithm may be applied to the program cookie 411 to improve transmission reliability. Other coding algorithms may be used in alternative embodiments.

The content-augmented broadcast signal 406 is subsequently provided to the broadcast means 403 (e.g., a satellite transmitter 403a, cable television transmitter 403b, or broadcast tower 403c) for broadcasting to conventional television or radio sets. Depending on the transmitter used, the content-augmented broadcast signal 406 may be further encoded or modulated into formats suitable for transmission by the transmitter. For example, when the broadcast tower 403c is used for transmitting radio broadcast signals, the Amplitude Modulation (AM) or Frequency Modulation (FM) technique may be used.

As used herein, the term "conventional television set" refers to conventional analog television sets, such as those configured to process broadcast signals transmitted in NTSC format (for example, North American Basic Teletext Standard (NABTS)), PAL and SECAM broadcast formats (for example, the European Broadcast Union (EBU) Teletext Standards). In a further embodiment, the term "conventional television set" includes digital televisions receivers, such as those operable to process HDTV broadcasts using, for example, the Vertical Ancillary Data Standard (VANC), and the like standard. The term "conventional radio set" includes digital audio broadcasting systems and receivers.

Figure 5:
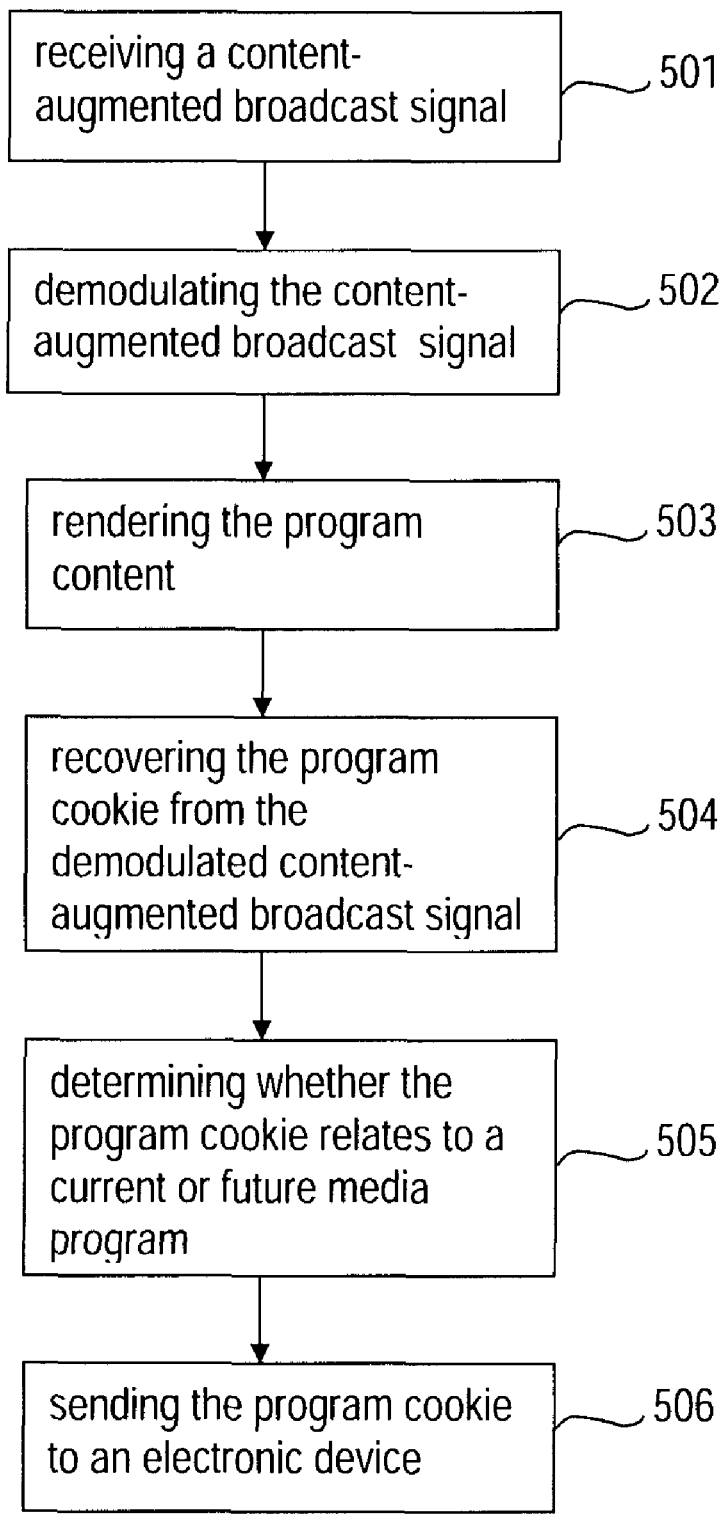
FIG. 5 shows a flow-chart of a method for communicating media program information according to an embodiment.

FIG. 5 shows a flow-chart of a method for communicating media program information according to an embodiment. Step 501 includes receiving the content-augmented broadcast signal at a conventional broadcast receiver. As already described earlier, the content-augmented broadcast signal has a program content and a program cookie which relates to the program content. The received content-augmented broadcast signal is demodulated by the conventional broadcast receiver at step 502 and the program content is rendered by the conventional broadcast receiver at step 503. In an embodiment where a television receiver is used as the conventional broadcast receiver, the program content includes video and audio portions of the media program. The video and audio portions of the program content are subsequently decoded, and are rendered in the conventional manner by the television receiver.

Step 504 includes recovering the program cookie from the demodulated content-augmented broadcast signal. The program cookie is recovered at about the same time the program content is rendered. Step 505 includes determining whether the recovered program cookie includes information relating to a current media program or to an advertisement of a future media program. The broadcast signal may relate to media programs such as a documentary program, a variety program, a drama serial, advertisement from sponsors, etc. These programs are called current media programs as they are currently being broadcasted to users for their viewing. Sometimes, the broadcast signal may relate to advertisement of media programs which will be broadcasted in future, such as a preview of a movie which will be broadcasted the following day at 7 pm. This preview of the movie is an example of the advertisement of a future media program.

Step 506 includes sending the program cookie to an electronic device. The electronic device may be a Personal Computer (PC), a laptop, a mobile phone or a Personal Digital Assistant (PDA). The program cookie may be sent to the electronic device using wired means or wireless means such as Bluetooth, infrared or Wireless LAN.

Figure 6A:
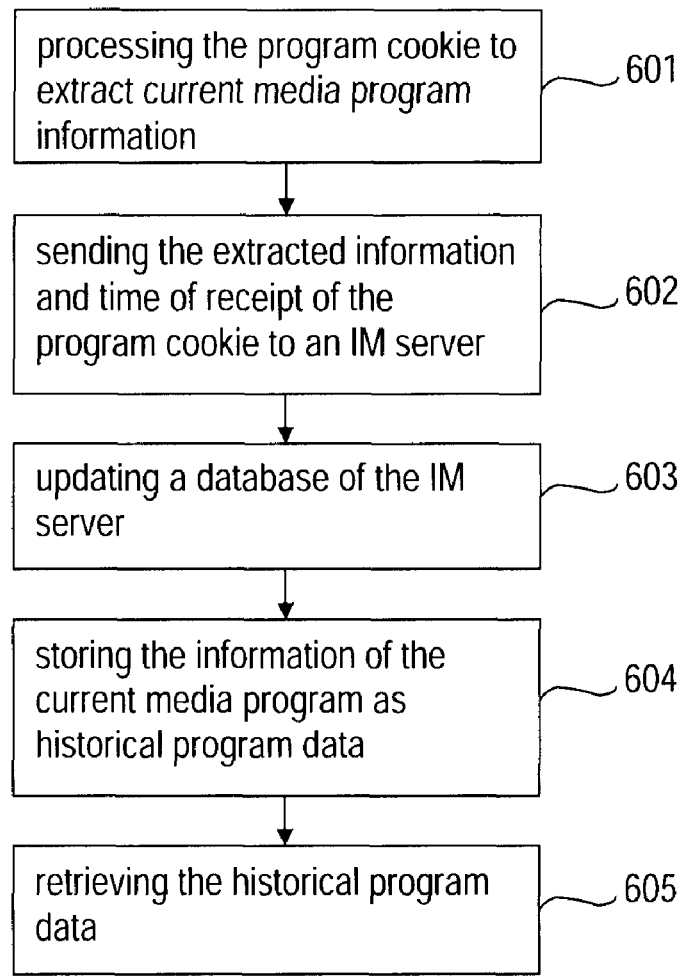
FIG. 6A shows a flow-chart of further steps of the method depicted in FIG. 5 when the program cookie was determined to include information relating to a current media program according to an embodiment.

FIG. 6A shows a flow-chart illustrating further steps of the method depicted in FIG. 5 when the program cookie was determined to include information relating to the current media program. Step 601 includes processing the program cookie to extract information relating to the current media program. The processing of the program cookie is done by a receiving application in the electronic device. In an embodiment, the information relating to the current media program includes the name and channel of the current media program and the time a user of the electronic device started watching or listening to the media program. An example of a program cookie of a current media program is "Channel=Discovery, Program=African's Lions".

Step 602 includes sending the extracted information relating to the current media program and the time the program cookie was received by the electronic device to an Instant Messenger (IM) server. In an embodiment, the IM server resides on the Internet, and the electronic device sends the extracted information and the time the program cookie is received to the IM server through the Internet.

An IM program is a client application typically installed in an electronic device. The IM server is a server application connecting one or more IM programs. Therefore, the connectivity among different IM programs installed in various electronic devices is maintained by the IM server. Each user of the IM program normally maintains a user list displaying the nicknames of the other IM program users, known as buddies. The online and offline status of each buddy is indicated in the user list accordingly. The IM server includes a database to store information relating to the users of the IM programs.

Step 603 includes updating the database of the IM server with the information relating to the current media program the user is watching or listening to, such that when the user is displayed on the user list of the IM program of another user, the information relating to the current media program the user is currently watching or listening to is also displayed on the user list of the IM program of the other user.

Step 604 includes storing the information relating to the current media program and the time of receipt of the program cookie in the database of the IM server as historical program data. These historical program data hence contain a history of the media programs watched by the user. Step 605 includes retrieving the historical program data of the user to determine a number of times the media program has been watched by the user, or to display media programs previously watched by the user.

The historical program data may also include details about media programs viewed partially. These details about the media programs viewed partially act as bookmarks into the video/audio content, and enable the user to retrieve them from a personal video/audio recorder or an Internet Protocol TV (IPTV) Video-On-Demand (VOD) server to view the unviewed content at a later time.

Figure 6B:
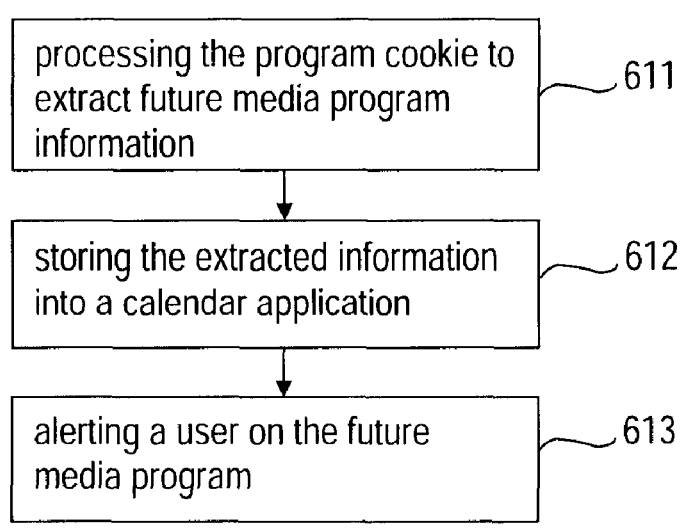
FIG. 6B shows a flow-chart of further steps of the method depicted in FIG. 5 when the program cookie was determined to include information relating to a future media program according to an embodiment.

FIG. 6B shows a flow-chart illustrating further steps of the method depicted in FIG. 5 when the program cookie was determined to include information relating to the advertisement of a future media program. Step 611 includes processing the program cookie to extract information relating to the future media program. The processing of the program cookie is done by the receiving application in the electronic device. In an embodiment, the information relating to the future media program includes the name, channel and genre of the future media program, the date when the future media program will be broadcasted, the time and duration of the future media program. An example of a program cookie of a future media program is "Program=Autumn Glory, Channel=HBO, Date=Jan. 1, 2007, time=21.00-24.00, genre=thriller".

Step 612 includes storing the extracted information into a calendar application. The calendar application may reside in the electronic device or in a server in the Internet. Examples of the calendar application include, but not limited to, Microsoft Outlook and Outlook Express. Accordingly, the information on the future media program is stored as an event in the calendar application. Step 613 includes alerting the user by the calendar application of the future media program. The alerting of the future media program may be done by setting an alarm or sending an email notification/SMS to the user at predefined intervals before the scheduled broadcast of the media program.

In some cases, the user may not be interested in watching the future media program. Therefore, the user may not want to store the information relating to the future into the calendar application. Accordingly, the user may be asked whether he/she wants to store the information relating to the future media program into the calendar application when it was determined that the program cookie relates to a future media program (Step 505) in an embodiment. In an alternative embodiment, the user is asked whether he/she wants to store the information relating to the future media program into the calendar application after the information relating to the future media program was extracted (Step 611).

Figure 7:
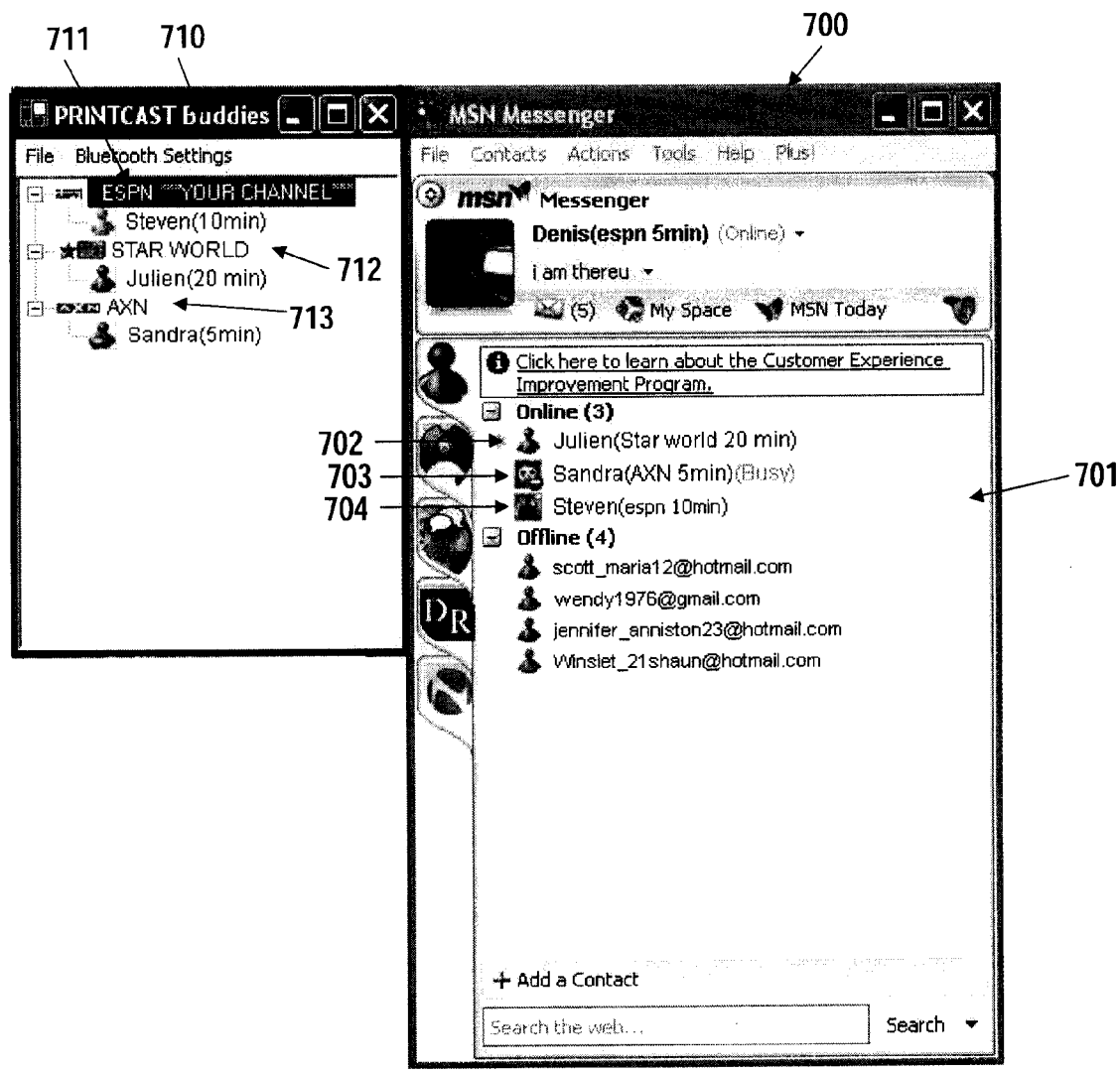
FIG. 7 shows an example of an Instant Messenger program according to an embodiment.

FIG. 7 shows an example of a user list 701 of an IM program 700 of a user Dennis. On the user list 701, there are several buddies including Julien 702, Sandra 703 and Steven 704. Dennis and Steven 704 are watching ESPN, Julien 702 is watching Star World and Sandra 703 is watching AXN. The information relating to the TV programs (ESPN, Star World and AXN) the buddies of Dennis are currently watching is also displayed on the user list 701. In addition, the time the corresponding buddy has started watching the TV program may also be displayed. From FIG. 7, it can be seen that Julien 702 has been watching Star World for the last 20 minute.

In an embodiment, the information relating to the media program the user is currently watching or listening to is only displayed on the user list when the user has been watching or listening to the program for more than a predefined time, for example, more than 5 minutes. This is because sometimes the user has not decided which media program to watch or listen to, and is currently flipping channels to search for the program which interests him. By displaying the information relating to the media program only after the user has been watching or listening to the program for more than the predefined time, the media programs as a result of channel flipping by the user would not be displayed.

As media program also includes advertisements, information relating to the advertisements watched by the user may also be extracted and stored as historical program data in the IM server in an embodiment, in the same way for TV or radio programs. Accordingly, advertisers will be able to determine who have watched or listened to their advertisements, and may provide incentives for these people.

In another embodiment, the advertisements the user is currently watching is displayed on the user list of the IM program of his/her buddies. Accordingly, his/her buddies may talk to one another about the advertisements they have watched or listened to. For example, if the advertisement relates to a sale in one of the boutiques and a user realized that one of his/her buddy did not watch that advertisement but would be interested in the sale, he/she may inform his/her buddy about the sale.

The IM program 700 may also display a supplementary window 710 where the buddies on the user list 701 are grouped under the TV programs they are currently watching. For example in FIG. 7, Steven is grouped under the TV Program ESPN 711, Julien is grouped under the TV Program Star World 712, and Sandra is grouped under the TV Program AXN 713. The grouping by TV programs in the supplementary window 710 allows Dennis to know what his friends are watching currently, and tune in to the TV program which most people are watching. If Dennis belongs to a tour company, he may send tour related advertisements to the group of people who are watching a travel TV program.

Figure 8:
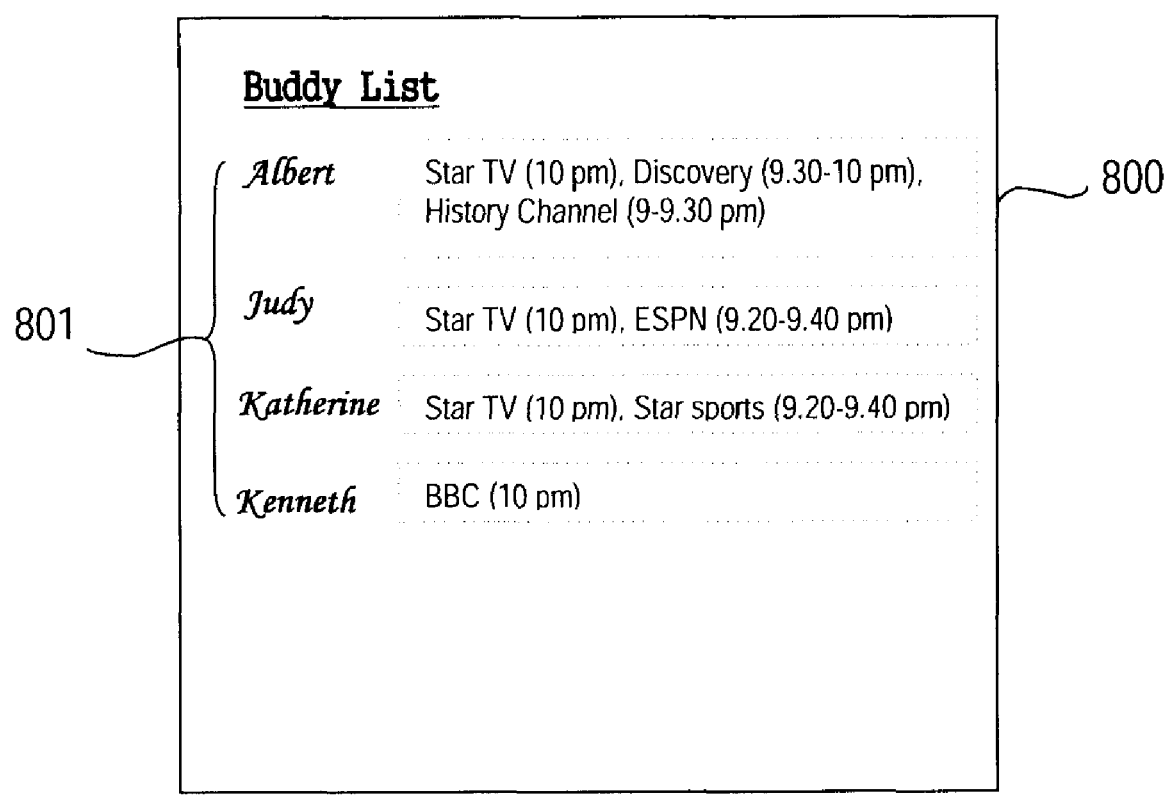
FIG. 8 shows an example of a user list displaying the current and previous television programs associated with each user on the user list.

FIG. 8 shows an example of a user list 800 displaying the current and previous television programs associated with each buddy 801 on the user list 800. It can be seen that Albert is currently watching Star TV since 10 pm, and previously watched Discovery from 9.30 pm to 10 pm and History Channel from 9 pm to 9.30 pm. Both users Judy and Katherine are also watching Star TV. On seeing that Kenneth is not watching Star TV, one of the buddies 801 could call him to switch to Star TV or brief him on the program.

Figure 9:
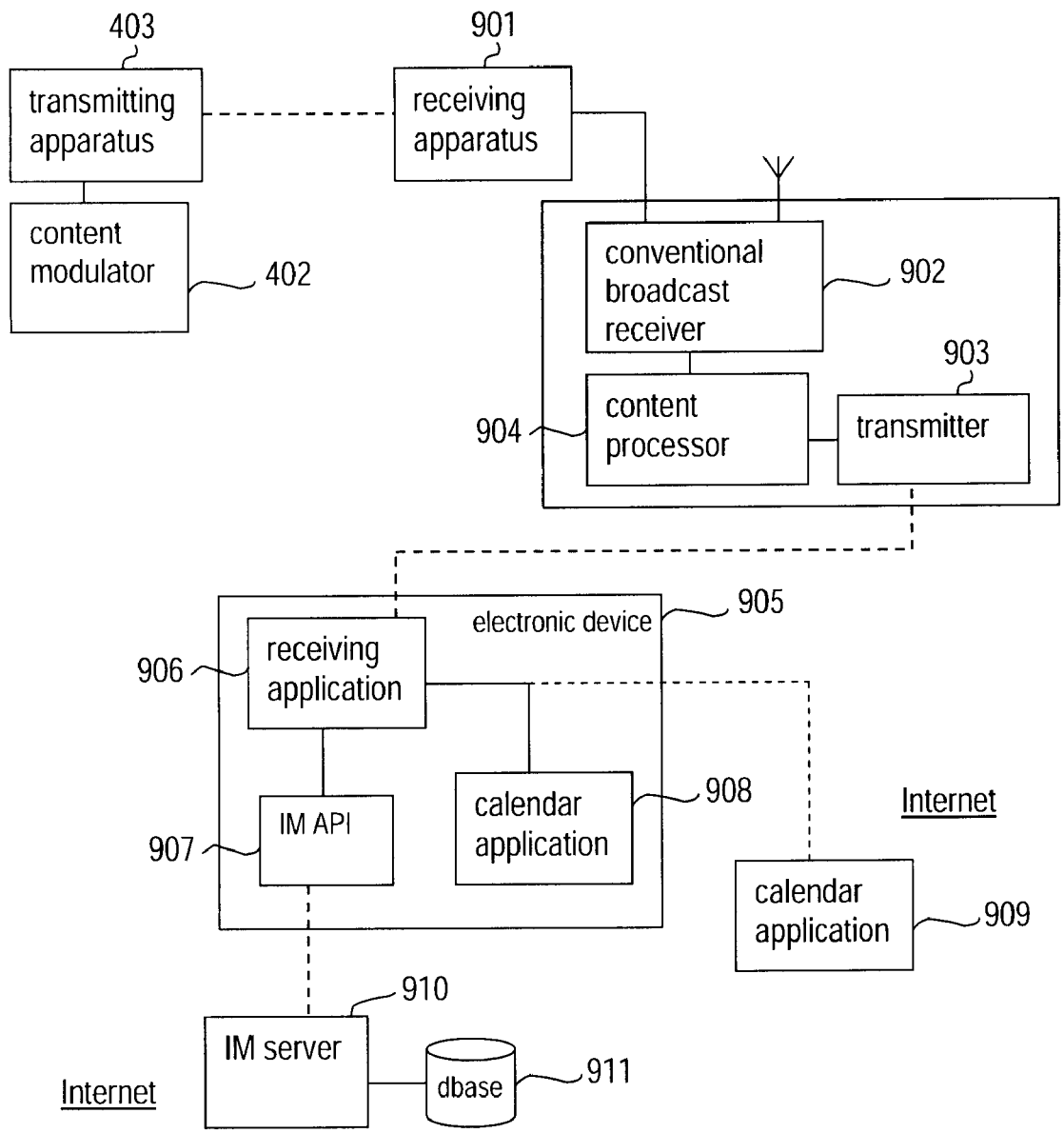
FIG. 9 shows a system for communicating media program information according to an embodiment.

FIG. 9 shows a system for communicating media program information according to an embodiment. As already seen in FIG. 4, the content modulator 402 forms the content-augmented broadcast signal. Depending on the manner of transmission, the content-augmented broadcast signal from the content modulator 402 may be further encoded or modulated by the transmitting apparatus 403 into a format suitable for a desired transmission method. The transmitted signal is received by a corresponding receiving apparatus 901 and is decoded or demodulated back into the content-augmented broadcast signal. For example, if the content-augmented broadcast signal is transmitted using the cable TV transmitter 403b, the corresponding receiving apparatus 901 may be a set-top box to recover the content-augmented broadcast signal.

A conventional broadcast receiver 902 is adapted to receive the content-augmented broadcast signal, demodulate the content-augmented broadcast signal to recover the standard program content, and render the standard program content. The content-augmented broadcast signal is in the format of the original television broadcast signal which can be processed by a conventional broadcast set. For example, when the broadcast signal is a television broadcast signal, the content-augmented broadcast signal can be processed by a conventional television set.

In an embodiment, the conventional broadcast receiver 902 is a conventional television set. The conventional television set includes a demodulation circuitry for demodulating the received content-augmented broadcast signal. The standard program content of the demodulated signal is rendered by the television set on the television screen in a conventional manner. The conventional broadcast receiver 902 may be a DAB receiver or any digital television receiver in other embodiments.

A content processor 904 is operable to receive the demodulated content-augmented broadcast signal and to extract the program cookie therefrom. The content processor 904 also determines whether the program cookie includes information relating to the current media program or to an advertisement of a future media program. A transmitter 903 sends the program cookie to an electronic device 905.

The electronic device 905 includes a receiving application 906 adapted to receive the program cookie and to extract information from the program cookie. The receiving application 906 records the time the program cookie is received by the electronic device 905. When the program cookie was determined to include information relating to the current media program, the receiving application 906 extracts the information relating to the current media program. An Instant Messenger (IM) Application Program Interface (API) 907 sends the extracted information and the time the program cookie was received to an IM server 910 in the Internet.

A database 911 connected to the IM sever 910 is also updated with the extracted information and the time of receipt of the program cookie corresponding to the user of the electronic device 905. When the user is displayed as a buddy in a user list of an IM program of another user, the information relating to the current media program the user is currently watching or listening to is also displayed on the user list of the IM program of the other user. All the extracted information and time of receipt of the corresponding program cookie are stored in the database 911 as historical program data.

In an embodiment, the IM server 910 includes a software application for retrieving the historical program data and determining the number of times the current media program has been watched or listened to by the user. The software application may also retrieve the historical program data to determine media programs previously watched or listened to by the user and display it on the user list of the IM program of the other user in an alternative embodiment. Therefore, in addition to displaying information of the media program currently watched or listened to by the user, media programs previously watched or listened to by the user may also be displayed.

When the program cookie was determined to include information relating to an advertisement of a future media program, the receiving application 906 in the electronic device 905 extracts information relating to the future media program. In an embodiment, the extracted information relating to the future media program includes the name of the future media program, the date when the future media program will be broadcasted, and the time and duration of the future media program.

The extracted information relating to the future media program is sent to a calendar application 908 in the electronic device 905. The calendar application 908 may be any applications such as the Microsoft Outlook or Outlook Express which alerts the user of the upcoming media program. In an alternative embodiment, the calendar application 909 resides on the Internet, and the extracted information of the future media program is sent to the calendar application 909 over the Internet.

There may be circumstances when the program cookie was determined to include information relating to an advertisement of a future media program, but the user is not interested in storing the information relating to the future media program into his/her calendar program. In an embodiment, when the program cookie was determined to include information relating to an advertisement of a future media program, the receiving application 906 asks the user whether he/she wants to store the information relating to the future media program in the calendar application 908, 909. The receiving application 906 may ask the user through a user interface screen in a display unit (e.g. a screen) of the electronic device 905. The information relating to the future media program is stored in the calendar application 908, 909 only when the user indicates that he or she wanted to store the information.

In an alternative embodiment, when the program cookie was determined to include information relating to an advertisement of a future media program, a message is displayed on a display unit of the conventional broadcast receiver 902. The user indicates whether he or she wants to store the information in the calendar application 908, 909. Only when the user indicated that he or she wanted to store the information, the corresponding program cookie is transmitted by the transmitter 903 to the electronic device 905.

The user may indicate his or her intent using a remote control having a dedicated calendar button. The calendar button may be labeled "Remember This" for easy identification. When the dedicated calendar button is pressed, a signal indicating the intent of the user is sent to a receiving unit (not shown). The receiving unit may be inside a set top box connected to a television set, inside a television with an inbuilt set top box, or fitted to a Personal Computer (PC) with a television card (e.g. Media center PC).

The receiving unit may also be in a laptop, PDA or PC that can record the user intent. Alternatively, the receiving unit may also be connected to a VOD server at an IPTV provider. The signal indicating the intent of the user may be sent to the receiving unit using wired or wireless means, for example, Infrared or Bluetooth.

According to an embodiment, a group of friends may synchronize their calendar applications so that they may also be alerted on the future media programs which their friends might be watching or listening to. If an advertiser is able to look at the calendar applications of a group of people, the advertiser may be able to push targeted advertisements to this group of people. Also, if a media broadcaster is able to view the calendar applications of a group of people, the broadcaster may alert a group of people on any upcoming related media programs.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for communicating media program broadcast information, the method comprising:

receiving a content-augmented signal at a conventional broadcast receiver, the content augmented broadcast signal having a program content and a program cookie relating to the program content;

demodulating the content-augmented broadcast signal;

rendering the program content;

recovering the program cookie from the demodulated content-augmented broadcast signal at substantially the same time the program content is rendered;

determining whether the program cookie comprises information relating to a current media program a user is currently watching or listening to, or to an advertisement of a future media program;

sending the program cookie to an electronic device; and when the program cookie is determined to comprise information relating to the current media program:

processing the program cookie to extract the information relating to the current media program;

sending the extracted information relating to the current media program and a time at which the program cookie is received by the electronic device to an Instant Messenger server on the Internet; and updating a database of the Instant Messenger server with the information relating to the current media program a user is watching or listening to, such that when a user of the electronic device is displayed in a user list of an Instant Messenger program of another user, the information relating to the current media program the user is currently watching or listening to is also displayed on the user list of the Instant Messenger of the other user.

2. The method of claim 1, further comprising:
receiving a broadcast signal of a program, the broadcast signal comprising a program portion and a non-program portion, the program portion containing the program content;
receiving the program cookie associated with the program content; and
combining the program cookie onto the non-program portion to form the content augmented broadcast signal.

3. The method of claim 2, wherein receiving the broadcast signal comprises receiving a digital audio broadcasting signal having a program associated data channel, a television broadcast signal having a horizontal blanking interval or a television broadcast signal having a vertical blanking interval for use as the non-program portion.

4. The method of claim 1, wherein the extracted information relating to the current media program and the time at which the program cookie is received by the electronic device is sent to the Instant Messaging server using an Instant Messenger Application Program Interface (API).

5. The method of claim 1, wherein the information relating to the current media program displayed on the user list of the other user includes a name of the current media program and a time the user started watching or listening to the media program.

6. The method of claim 1, further comprising storing the information relating to the current media program and the time at which the program cookie is received by the electronic device in the database of the Instant Messenger server as historical program data.

7. The method of claim 6, further comprising
retrieving the historical program data; and
determining, based on the retrieved historical data, the number of times the current media program has been watched or listened to by the user.

8. The method of claim 6, further comprising
retrieving the historical program data; and
displaying, in addition to the current media program, information relating to at least one media program previously watched or listened to by the user.

9. The method of claim 1, wherein the information relating to the current media program is displayed on the user list of the other user only when the current media program has been watched or listened to by the user longer than a predefined time.

10. The method of claim 1, wherein when the program cookie is determined to comprise information relating to an advertisement of a future media program, the method further comprises:
processing the program cookie to extract the information relating to the future media program;
storing the extracted information of the future media program into a calendar application as an event; and
alerting the user on the future media program.

11. The method of claim 10, wherein the information relating to the future media program comprises at least one of the following:
name of the future media program;
date when the future media program will be broadcasted; and
time and duration of the future media program.

12. The method of claim 1, wherein, when the user of the electronic device is displayed in the user list of the Instant Messenger program of the other user, information relating to at least one media program previously watched or listened to by the user is also displayed on the user list of the Instant Messenger of the other user.

13. The method of claim 1, further comprising:
when the program cookie is determined to comprise information relating to a current advertisement:
processing the program cookie to extract the information relating to the current advertisement;
sending the extracted information to the Instant Messenger server on the Internet; and
storing the information relating to the current advertisement in the database of the Instant Messenger server as historical program data.

14. A system for communicating media program information comprising:
a content modulator for combining a program cookie with a broadcast signal of a program to form a content-augmented broadcast signal, the program cookie being associated with the program;
a conventional broadcast receiver for receiving the content-augmented broadcast signal, demodulating the same and rendering the program;
a content processor coupled to the conventional broadcast receiver for receiving the demodulated signal therefrom, recovering the program cookie, and determining whether the program cookie comprises information relating to a current media program a user is currently watching or listening to, or to an advertisement of a future media program;
a transmitter for sending the program cookie to an electronic device; and
the electronic device, comprising:
a receiving application for receiving the program cookie and, when the program cookie is determined to comprise information relating to the current media program, for extracting information relating to the current media program; and
an Instant Messenger Application Program Interface (API) for sending the extracted information relating to the current media program and a time at which the program cookie is received by the electronic device to an Instant Messenger server on the Internet, when the program cookie is determined to comprise information relating to the current media program, and for updating a database of the Instant Messenger server such that when a user of the electronic device is displayed in a user list of an Instant Messenger program of another user, the information relating to the current media program the user is currently watching or listening to is also displayed on the user list of the Instant Messenger of the other user.

15. The system of claim 14, wherein the broadcast signal comprises a television signal having a program portion for carrying the program and a non-program portion for carrying the program cookie, the non-program portion being the vertical blanking interval or the horizontal blanking interval of the television signal.

16. The system of claim 15, wherein the conventional broadcast receiver comprises a television receiver operable to process at least one of NTSC, PAL, SECAM and HDTV television broadcast signals.

17. The system of claim 14, wherein the broadcast signal comprises a digital audio broadcast signal having a program portion for carrying the program and a non-program portion for carrying the program cookie, the non-program portion being the program associated data channel.

18. The system of claim 17, wherein the conventional broadcast receiver is a Digital Audio Broadcasting (DAB) radio receiver.

19. The system of claim 14, wherein the electronic device comprises at east one of the following:
   a mobile phone;
   a Personal Digital Assistant (PDA); and
   a Personal Computer (PC).

20. The system of claim 14, wherein the information relating to the current media program comprises a name of the current media program and a time the user started watching or listening to the media program.

21. The system of claim 14, wherein the database in the Instant Messenger server is adapted to store the information relating to the current media program and the time at which the program cookie is received by the electronic device as historical program data.

22. The system of claim 21, wherein the Instant Messenger server further comprises a software application for retrieving the historical program data and determining, based on the retrieved historical data, the number of times the current media program has been watched or listened to by the user.

23. The system of claim 21, wherein the Instant Messenger server further comprises a software application for retrieving the historical program data and displaying, in addition to the information relating to the current media program, information relating to at least one media program previously watched or listened to by the user.

24. The system of claim 14, wherein the electronic device further comprises:
   a receiving application for receiving the program cookie and, when the program cookie is determined to comprise information relating to an advertisement of a future media program, extracting information relating to the future media program and sending the extracted information relating to the future media program to a calendar application to be stored as an event therein, wherein the calendar application comprises means to alert a user of the calendar application on the future media program.

25. The system of claim 24, wherein the information relating to the future media program comprises at least one of the following:
   name of the future media program;
   date when the future media program will be broadcasted; and
   time and duration of the future media program.

26. The method of claim 14, wherein, when the user of the electronic device is displayed in the user list of the Instant Messenger program of the other user, information relating to at least one media program previously watched or listened to by the user is also displayed on the user list of the Instant Messenger of the other user.

* * * * *

UNITED STATES PATENT AND TRADEMARK OFFICE
CERTIFICATE OF CORRECTION

PATENT NO.         : 8,024,765 B2                              Page 1 of 1
APPLICATION NO.    : 11/611900
DATED              : September 20, 2011
INVENTOR(S)        : Krishnan Ramanathan et al.

It is certified that error appears in the above-identified patent and that said Letters Patent is hereby corrected as shown below:

In column 10, line 44, in Claim 1, delete "content augmented" and insert -- content-augmented --, therefor.

In column 11, line 15, in Claim 2, delete "content augmented" and insert -- content-augmented --, therefor.

In column 13, line 7, in Claim 19, delete "east" and insert -- least --, therefor.

Signed and Sealed this
Fifteenth Day of May, 2012

David J. Kappos
*Director of the United States Patent and Trademark Office*